United States Patent [19]

Cho

[11] Patent Number: 4,707,777
[45] Date of Patent: Nov. 17, 1987

[54] PRECOMMUTATED CURRENT SOURCE INVERTER

[75] Inventor: Gyu-Hycong Cho, Seongbuk, Rep. of Korea

[73] Assignee: Westinghouse Electric Corp., Pittsburgh, Pa.

[21] Appl. No.: 871,049

[22] Filed: Jun. 5, 1986

[51] Int. Cl.[4] .......................................... H02M 7/521
[52] U.S. Cl. .................................. 363/138; 318/767; 318/802
[58] Field of Search ................... 363/58, 96, 136–138; 318/802–804, 811, 767

[56] References Cited

U.S. PATENT DOCUMENTS 3,980,941  9/1976  Griebel ................................ 363/138
4,039,926  8/1977  Steigerwald ......................... 363/138

FOREIGN PATENT DOCUMENTS 57120  5/1979  Japan ................................. 318/802
43575  3/1982  Japan ................................. 363/137

Primary Examiner—William H. Beha, Jr.
Attorney, Agent, or Firm—C. M. Lorin

[57] ABSTRACT

In an auto-sequential commutated current source inverter (ASCI) system, an auxiliary bridge of thyristors is connected between auxiliary terminals, and a capacitor is charged and discharged resonantly by controlling a corresponding auxiliary thyristor of the bridge to connect the capacitor between the DC terminals and the AC terminals through the bridge in order to charge the capacitor at a precommutation level, whereby commutation of a main thyristor is effected at a reduced peak voltage, and no voltage clamp measure is necessary.

11 Claims, 17 Drawing Figures $V_c \geq V_{UV}$ $V_c < V_{UV}$

PRECOMMUTATED CURRENT SOURCE INVERTER

BACKGROUND OF THE INVENTION

The invention relates to current source inverters (CSI) in general, and more particularly to adjustable speed AC motor drives embodying the same. A current source inverter (CSI), as the name implies, is one where the variable frequency electrical output is a current wave rather than a voltage wave.

A CSI includes a large inductor on the DC-side and a three phase phase-controlled-rectifier (PCR) connected to the AC power line. The rectifier generates variable DC voltage which is converted to a variable current source by a large DC-link inductor. The thyristors of the inverter pass the current from the current source symmetrically to the three phases of the machine while generating a variable-frequency, six-stepped current wave in the CSI. The CSI has many advantages over the voltage-source inverter (VSI): fuseless protection, full four-quadrant regenerative capability with simple structure, rugged and reliable operation, etc. In spite of such advantages, the conventional CSI also has several limitations: lower operating frequency range, bulkiness, cost, high spike voltage at the machine terminals, etc. The shortcomings of the conventional CSI mainly arise from the existence of the leakage inductance of the machine. Energy exchange between the leakage inductance and the commutation circuit is necessary in order to obtain the change from phase to phase of the current of the machine at every instant of commutation. To accomplish this various methods have been used which, however, have the aforementioned limitations typical of the conventional CSI.

For instance, a well-known and widely used CSI is the auto-sequential commutated inverter (ASCI), the schematic of which is shown in FIG. 1. Six thyristors, six diodes and six capacitors are used in the ASCI. The capacitors are used both to commutate thyristors and to take over the energy stored in the leakage inductance of the machine. The diodes play a role in isolating the capacitors from the load and in helping to store energy for commutation.

In the ASCI, the operating range of the frequency and the spike voltages are a function of the load, the capacitance value and the machine leakage inductance. Since the capacitors are discharged and charged by the DC-current flowing from the current source during the time of commutation, the upper limit of the frequency of operation is limited by the light load condition and when the DC current is minimum. On the other hand, the capacitor receives its maximum voltage when at maximum load condition, when the DC current is maximum. In order to increase the operating frequency range, the capacitance value must be decreased and made as small as possible. However, the capacitance value should be increased and made as large as possible in order to decrease the peak capacitor voltage. The compromise resides in a choice of a capacitance value which makes the operating frequency somewhat lower and the voltage ratings of the thyristors and the diodes somewhat higher.

In order to cope with such problems, several modifications have been made in the circuitry. FIG. 3 hereinafter shows such a circuit with a diode, a resistor and an inductor connected in parallel with the main thyristor, whereby the capacitor discharging time is reduced and the operating frequency range is extended by creating with the inductance and the resistor an additional discharging path during the commutation interval. However, the efficiency of the inverter is reduced by the dissipation in the resistor of part of the commutation energy to prevent the capacitor voltage from building up too high as the commutating operation repeats itself.

In order to increase the inverter efficiency as well as to widen the operating range, clamp circuits have been used, as is shown in FIG. 4 hereinafter. In an ASCI with a clamp, the capacitors are used only for the commutation and the peak capacitor voltage is limited by the clamp circuit which absorbs the energy stored in the machine leakage inductance during the commutation interval. This type of circuit operates in a wide range of frequency and within a limited capacitor voltage. However, the clamp circuit tends to be bulky and expensive if a technique is used by which the energy is reconverted to in such a form that it can be passed back into the power line.

SUMMARY OF THE INVENTION

A new CSI is proposed having high inverter efficiency, wide range of operating frequency and low spike voltages (with greatly reduced total capacitance value) upon the semiconductor devices. There is also no need for a voltage clamp circuit. The invention resides in using pre-commutation in an ASCI system whereby, instead of merely discharging the capacitor energy, this energy is kept in reserve for the subsequent commutation cycle. The system according to the invention uses only one commutation capacitor which is used to commutate the main thyristors and to exchange energy between the leakage inductance of the machine and the commutation circuit. To that effect, positive and negative polarity commutation thyristors and six auxiliary thyristors are used to distribute the current to the respective AC phases in relation to the main thyristors. Moreover, the polarity of the capacitor voltage is reversed through an inductor by controlling one of two inversion thyristors respectively affected to the opposite polarities.

DETAILED DESCRIPTION OF THE INVENTION

Figure 1:
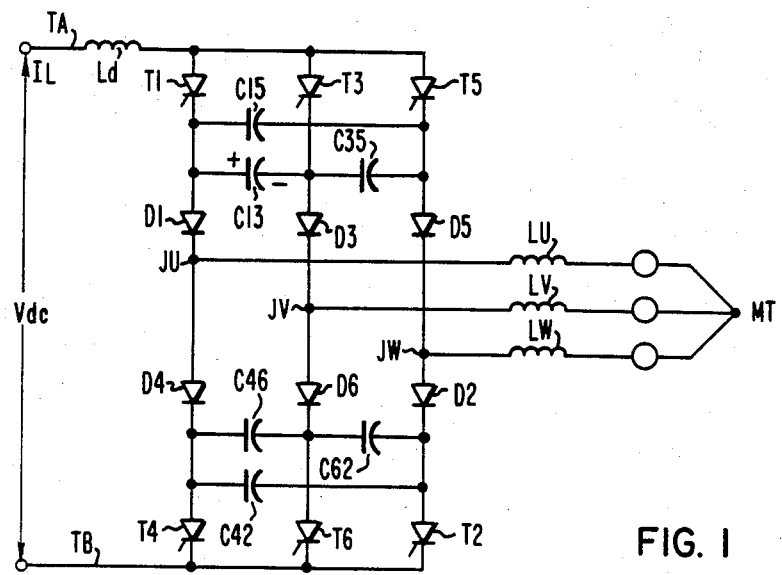
FIG. 1 shows an auto-sequential commutated inverter (ASCI) of the prior art.

Referring to FIG. 1, a conventional auto-sequential commutated inverter is shown to include a diode ($D_1$–$D_6$) in series with each thyristor ($T_1$–$T_6$) for each pole ($T_1$, $T_4$), ($T_3$, $T_6$), ($T_5$, $T_2$) of a thyristor bridge in relation to respective nodal points $J_U$, $J_V$, $J_W$ with respective AC input lines U, V, W to a motor MT. In addition, commutating capacitors are interconnected for each polarity between the respective nodal points of the series networks formed by a thyristor and a diode. Thus, capacitor $C_{15}$ is between ($T_1$, $D_1$) and ($T_5$, $D_5$), capacitor $C_{13}$ between ($T_1$, $D_1$) and ($T_3$, $D_3$) and capacitor $C_{35}$ between ($T_3$, $D_3$) and ($T_5$, $D_5$), and so on for the negative polarity. $T_A$ and $T_B$ are the positive and negative terminals.

Figure 2:
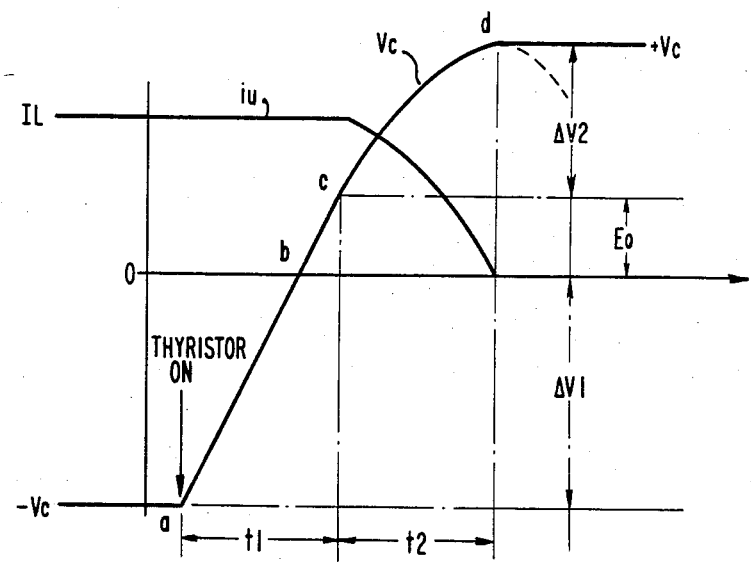
FIG. 2 illustrates with curves the operation of the circuit of FIG. 1.

Referring to FIG. 2, assuming conduction is between $T_1$ and $T_2$, thus along phases U and W while carrying a current $I_L$, when thyristor $T_3$ is being gated ON, capacitor $C_{13}$ which was initially charged as shown in FIG. 1, will (1) turn OFF thyristor $T_1$, and (2) start discharging from charge $-V_c$ following trajectory abcd, d corresponding to the new charge $+V_c$ of the capacitor after $T_3$ is ON and $T_1$ is OFF. The commutation is completed and the current path is through phase lines V and W at this final stage. When discharging, the capacitor reaches an operative point c (beyond the zero charge level marked by operative point b) owing to the motor voltage $E_o$ between phase lines. Then, from c to d takes place a resonant charging in the opposite polarity due to the effect of the line inductances $L_U$, $L_V$ in conjunction with the capacitor $C_{13}$. Diode $D_1$ prevents the resonant portion (dotted line) from extending downward beyond point d. Thus, capacitor $C_{13}$ has been first working as a commutation capacitor for the off-going thyristor $T_1$, and it has absorbed energy taken over from the energy stored in the leakage inductance of the machine. The diodes ($D_1$-$D_6$) play the role of isolating the capacitors from the load and they help store energy for commutation. The commutation period is defined by total time ($t_1+t_2$), where $t_1$ is the unloading time, and $t_2$ the resonant charging time.

Figure 3:
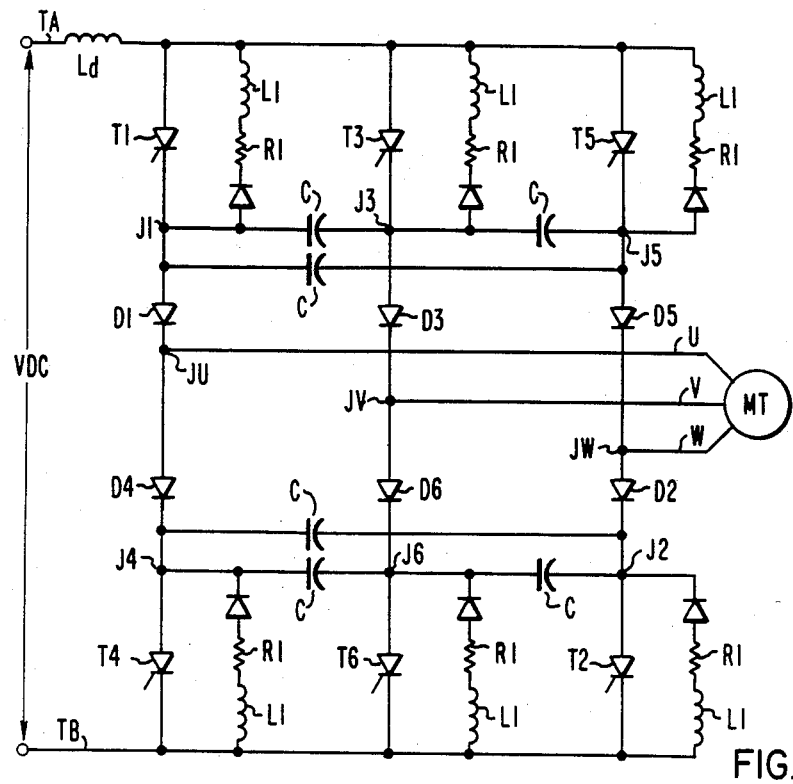
FIG. 3 is a prior art ASCI including ring around reactors and resistors.

Referring to FIG. 3, a prior art bridge of six thyristors $T_1$-$T_6$ connected between DC terminals $T_A$, $T_B$ and the phase AC output lines U, V, W, is shown to include diodes $D_1$-$D_6$ in series between the respective thyristors, the junction points $J_1$-$J_6$ being common with the thyristors and $J_U$, $J_V$, $J_W$ with the output lines. Like in FIG. 1, commutation capacitors C join poles on each polarity side. In order to reduce the capacitor discharging time, and extend the frequency range of operation, additional discharging paths are provided with series network of inductance and resistor ($L_1$, $R_1$) with a connecting diode as shown between each of junction points ($J_1$-$J_6$) and the associated DC terminal.

Figure 4:
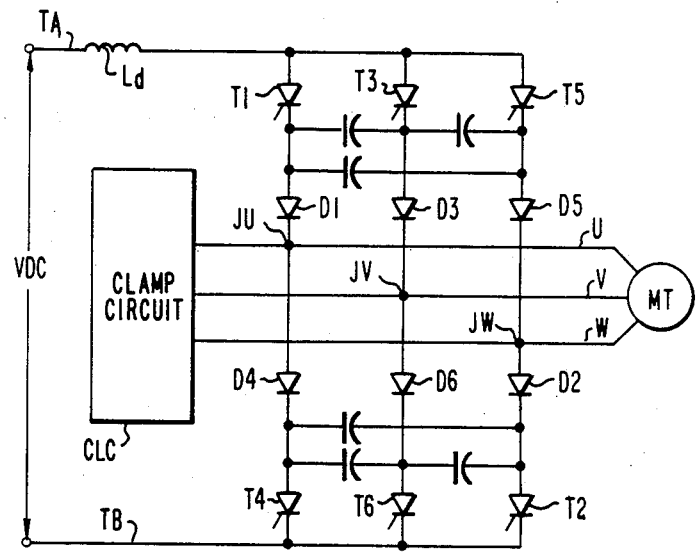
FIG. 4 is a prior art ASCI including a clamp circuit.

Referring to FIG. 4, another prior art bridge, much like FIG. 3, in that main thyristors ($T_1$-$T_6$), diodes ($D_1$-$D_6$) and commutation capacitors are used between poles, however, with the provision of a clamp circuit CLC connected with junction points $J_U$, $J_V$, $J_W$. Due to the clamp circuit, the energy stored in the machine leakage inductance during the commutation interval is absorbed, thereby allowing wider range of operation and less capacitor voltage.

The present invention resides in making use of a redundancy occurring in the commutation process just described.

It appears from FIG. 2 that the major portion of the time interval $t_1$ is in effect the discharging period of the capacitor energy stored during the previous commutation cycle and that it can be much longer than that required for recovering the thyristor. Interval $t_2$ is the resonant charging period of the capacitor in relation to the machine leakage inductance when the phase-to-phase current change of the machine occurs. If the energy stored during the previous cycle can be put to use instead of being wasted, for instance by simply discharging it to supply current to the next phase of the machine which the current will flow through right after termination of the current flowing in the present phase, the capacitors will have been used more efficiently. An inverter operated in this manner is said to be a precommutated current source inverter (PCSI), since such operation occurs just prior to actual commutation of the main thyristor. Inverters so designed, namely using the concept of precommutation, have a number of advantages over the conventional CSI's.

Figure 5:
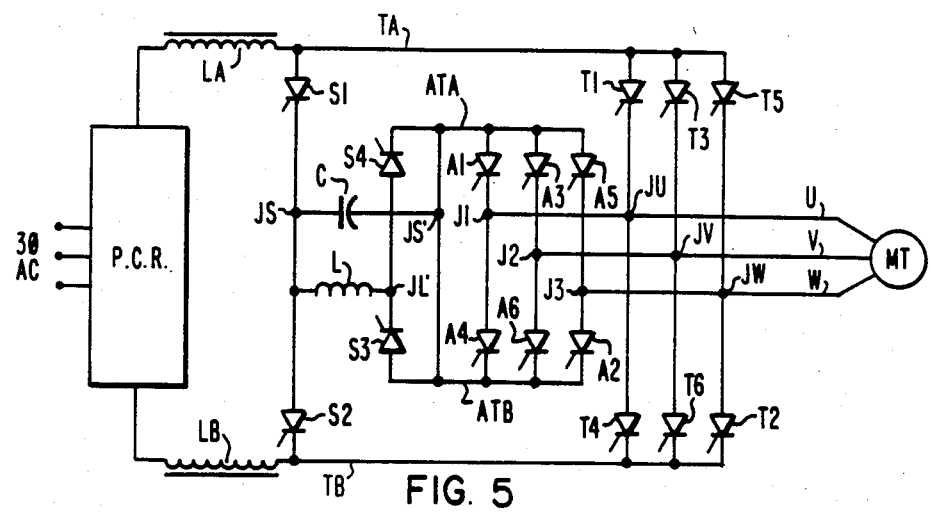
FIG. 5 shows the basic pre-commutated current source inverter according to the present invention.

A new precommutated current source inverter (PCSI) is proposed as illustrated in FIG. 5. Curves illustrating the commutation cycle are shown in FIG. 6. A single commutation capacitor C is used both to commutate the main thyristors and to exchange energy between the leakage inductance of the machine and the commutation circuit. Six auxiliary thyristors ($A_1 \sim A_6$), connected in a bridge between terminals ATA, ATB, are provided and connected by respective nodal points $J_1$, $J_2$, $J_3$ to the three phases U, V, W of the machine, and connected to the main thyristors ($T_1 \sim T_6$) via the nodal points $J_U$, $J_V$, $J_W$. The current flowing through the commutation capacitor (C) can flow through one of the three phases of the machine depending upon the control of the auxiliary thyristors. Two commutating thyristors ($S_1$, $S_2$) serially connected via a nodal point $J_S$ between DC terminals ($T_A$, $T_B$) are being connected to the terminals ATA, ATB of the auxiliary thyristor bridge through the commutating capacitor (C) and a nodal point $J_S'$. Thus, the commutating capacitor C between the nodal point $J_S$ of $S_1$ and $S_2$ and the nodal point $J_S'$ belongs to terminal ATA associated to auxiliary thyristors $A_1$, $A_3$, $A_5$ for one polarity and to terminal ATB associated to auxiliary thyristors $A_4$, $A_6$, $A_2$ for the other polarity, like those of the main thyristors $T_1$-$T_6$. The upper side main thyristors ($T_1$, $T_3$, $T_5$) are commutated by turning ON the upper commutating thyristor ($S_1$) and, inversely, the lower side main thyristors ($T_2$, $T_4$, $T_6$) are commutated by turning ON the lower side commutating thyristor ($S_2$). Two serially-connected inversion thyristors ($S_3$, $S_4$) are connected in antiparallel to the ($A_1$-$A_6$) auxiliary bridge, thus, across terminals ATA, ATB. The nodal point $J_L'$ between $S_3$ and $S_4$ is connected to the nodal point $J_S$ of commutation thyristors $S_1$, $S_2$, through an inductor (L). Accordingly, $S_3$ or $S_4$ is connecting one end of the commutation capacitor C to one end of the inductor L, and the polarity of the capacitor voltage is being inverted through the inductor L by turning ON either the upper, or the lower, commutation thyristor ($S_4$, $S_3$).

Figure 6A:
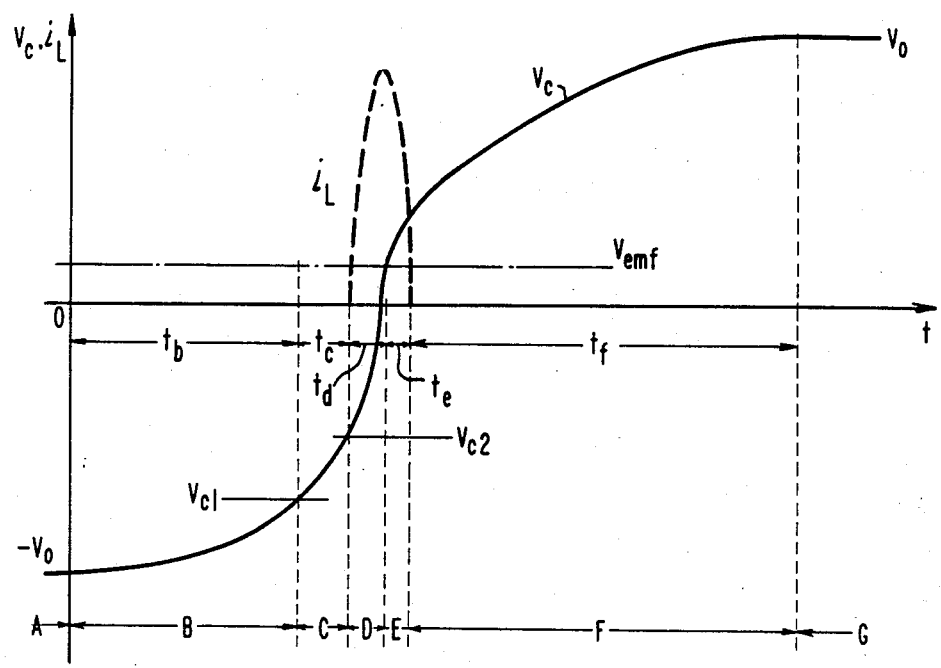
FIGS. 6A, 6B illustrate with curves the commutation cycle in the current source inverter of FIG. 5.
Figure 6B:
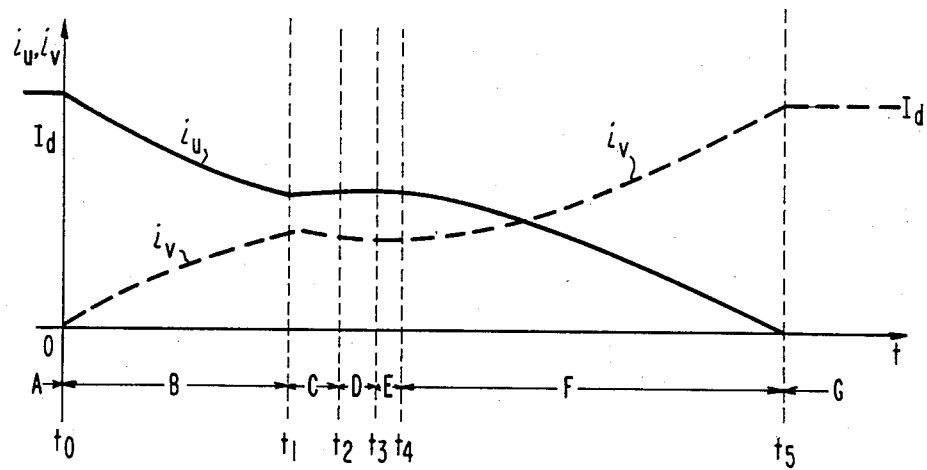

Referring to FIGS. 6A and 6B, the operation of the circuit of FIG. 5 is as follows:

(i) During a precommutation stage, one of the auxiliary thyristors ($A_1 \sim A_6$) is turned ON together with one of the commutating thyristors ($S_1$, $S_2$) in order to create a current path to the next phase of the machine prior to the commutation of the main thyristors.

(ii) After such a period of precommutation and before the polarity of the capacitor voltage has changed, the other auxiliary thyristor ($A_1$-$A_6$) which is in parallel with the main thyristor to be turned off is turned ON to commutate one of the main thyristors. The previously conducting main thyristor is now turned OFF by the remaining energy of the capacitor. This results in efficient commutation, considering the energy required here for commutation.

(iii) After a period which is sufficient to turn OFF the main thyristor, one of the inversion thyristors ($S_3$, $S_4$) is turned ON to cause a fast polarity reversal of the remaining capacitor voltage. This operation is especially important during no load operation when the source current is small. Owing to this, the circuit can operate over a wide range of frequency independently from load conditions.

(iv) After the polarity inversion of the capacitor voltage has been completed, the capacitor is resonantly charged until the current flowing through the main thyristor which is not being turned ON is equal to the source current.

Referring to FIGS. 6A and 6B and the time intervals (A-G) there shown, the operation of a commutation cycle will now be explained with more details:

For simplicity, it is assumed that the DC-link inductance is large enough to maintain constant current during the commutation cycle. The DC-source is assumed as in FIG. 5, to be composed of a phase controlled rectifier PCR so that with the DC-link inductors $L_A$, $L_B$ it can be considered as a current source. The modes of operation during a commutation cycle are explained by the illustration of FIGS. 7A-7H showing the current paths when transferring conduction successively from one another through thyristors $T_1$, $T_2$, $T_3$.

Figure 7A:
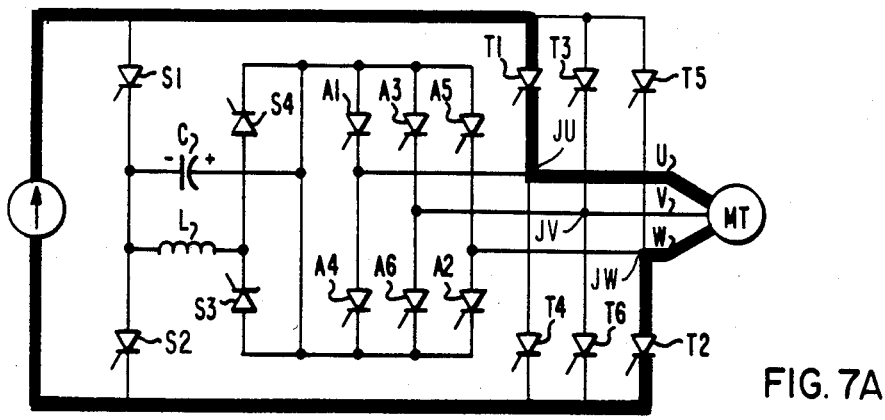
FIGS. 7A–7H show the current paths in the current source inverter of FIG. 5 for the successive time intervals A–G illustrated in FIGS. 6A and 6B.

Interval A (FIG. 7A)

Thyristors $T_1$ and $T_2$ are conducting and the DC-source current flows through the phases U and W of the machine. The commutating capacitor C is initially charged, in the direction shown by FIG. 7A, to voltage $-V_o$.

Figure 7B:
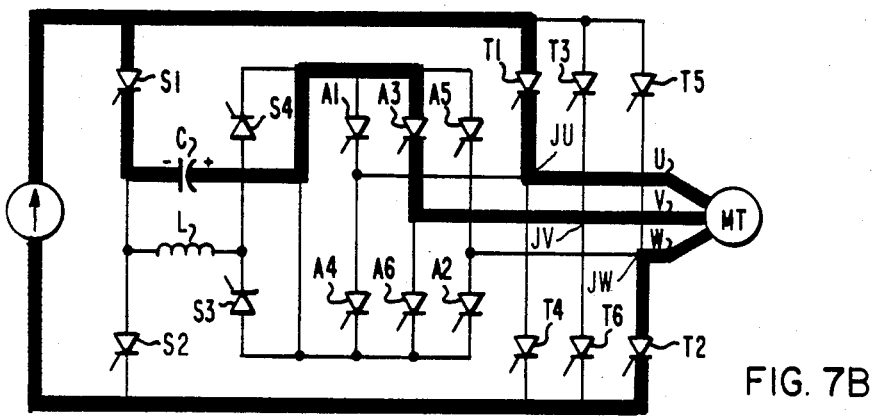

Interval B (FIG. 7B)

This is the precommutation interval. At time $t_o$ thyristor $S_1$ and the auxiliary thyristor $A_3$ are turned ON simultaneously. The phase V current $i_v$ gradually increases, while the phase U current $i_u$ gradually decreases during interval B (FIG. 6B). The time duration $t_b$ of this interval is controlled properly in relation to the load current to discharge the energy to a certain level $V_{c1}$ (FIG. 6A) but not to discharge it too much, in order to retain enough energy to turn OFF the main thyristor $T_1$ at the next interval (C). Interval B never appears in a conventional CSI. It is a characteristic feature of the precommutated current source inverter according to the invention.

Figure 7C:
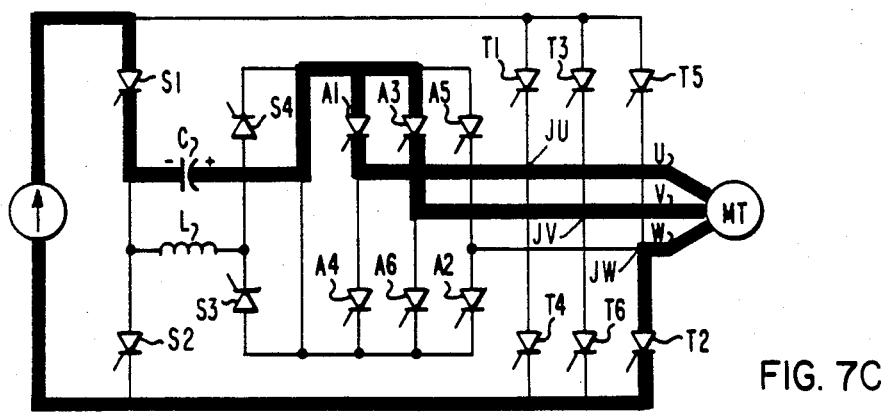

Interval C (FIG. 7C)

At time $t_1$ thyristor $A_1$ is now turned ON, which turns OFF thyristor $T_1$ due to the reverse bias voltage of the capacitor remaining from interval B. The DC-source current flows through the capacitor and through phases U and V. The duration of this interval C depends on the turn-OFF time requirement of the main thyristor $T_1$. The voltage of capacitor C goes from $V_{c1}$ to $V_{c2}$ (FIG. 6A), while currents $i_u$ and $i_v$ (FIG. 6B) remain nearly constant.

Figure 7D:
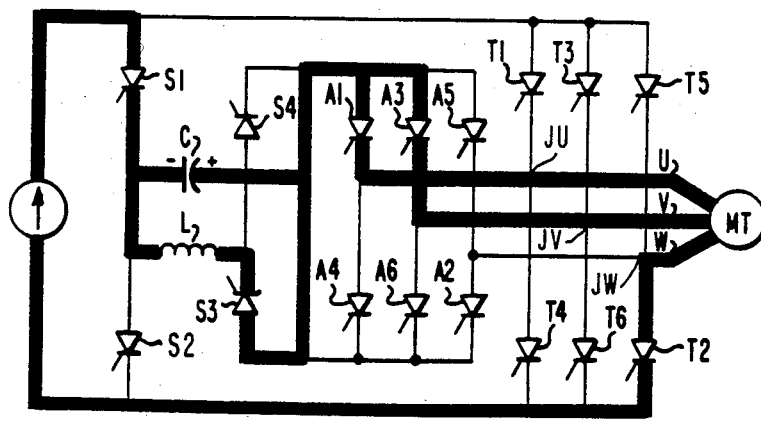

Interval D (FIG. 7D)

The voltage polarity of Capacitor C did not change during interval C. If the DC-source current is small (light load condition), the magnitude of the capacitor voltage remains large and negative after the termination of interval C. By turning ON thyristor $S_3$ at time $t_2$, the capacitor voltage is now caused to rapidly reverse through the inductor L. This eliminates unnecessary charging time of the capacitor. Interval D enables operation of the inverter over a wide range of frequency, independently of the load condition.

Figure 7E:
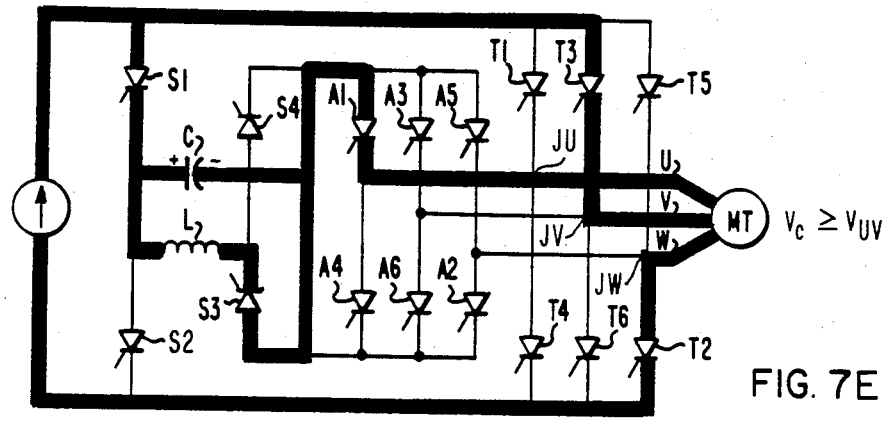
Figure 7F:
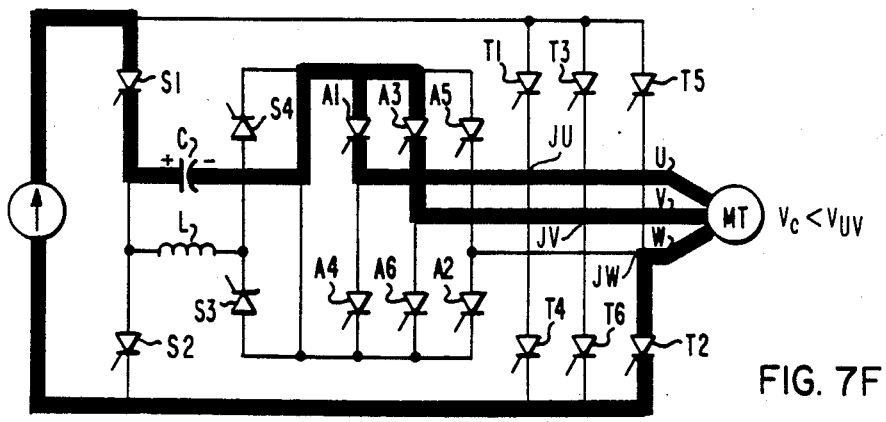

Interval $E_1$ or $E_2$ (FIG. 7E or 7F)

After interval D, depending upon whether the capacitor voltage reaches or exceeds the emf voltage ($V_{emf}$) between phases U and V of the machine or it does not, there will be either a single time interval $E_1$, or an additional time interval $E_2$ will be provided. The latter is skipped altogether if the capacitor voltage has reached $V_{emf}$ when interval D expires (time $t_3$ in FIG. 6B).

Interval $E_1$ (FIG. 7E)

This interval starts at time $t_3$ if the capacitor voltage exceeds the emf voltage $V_{emf}$ existing between the U and V phases of the machine, with current flowing through L. During interval $E_1$, thyristor $T_3$ is turned ON, thereby turning OFF $A_3$. The DC-source current is bisected into two current paths (as shown in FIG. 7E); one path is through thyristor $S_1$, capacitor C, thyristor $A_1$ and the U-phase of the machine. The other path is through thyristor $T_3$ and the V-phase of the machine.

Interval $E_2$ (FIG. 7F)

This interval starts when the inductor current $i_L$ (FIG. 6A) becomes zero, and the capacitor voltage $V_c$ is still less than the emf voltage $V_{emf}$ between U and V phases of the machine. (Otherwise interval $E_2$ is skipped.) The thyristor states and the current path for interval $E_2$ are equal to those of interval C (FIG. 7C).

Figure 7G:
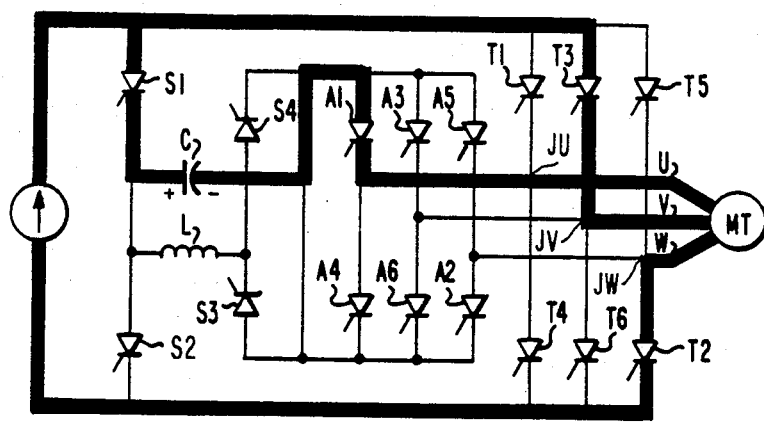

Interval F (FIG. 7G)

When the inductor current $i_L$ becomes zero and the capacitor voltage $V_c$ is greater than the emf voltage $V_{emf}$ between the U and V phases, interval F is initiated at time $t_4$. During this interval, the U phase current $i_u$ gradually decreases to zero while the V phase current $i_v$ gradually increases and becomes equal to the DC-source current (FIG. 6B). Capacitor C is resonantly charged. The maximum peak voltage of the capacitor at the end of interval F occurs under maximum load condition and it is approximately proportional to the initial current value of the U-phase at the beginning of interval F. As shown in FIG. 6B, the initial (time $t_4$) phase currents of interval F are approximately equal to the final currents of interval B (time $t_1$) which are considerably less than the DC-source current due to the precommutation effect. This is the main reason why capacitor voltage $V_c$ is lower, in the current source according to the invention, as compared with the conventional ASCI circuit. When capacitor voltage $V_c$ is lower, the semiconductor voltage ratings in the inverter are also lower by the same amount. This results in lower cost.

Figure 7H:
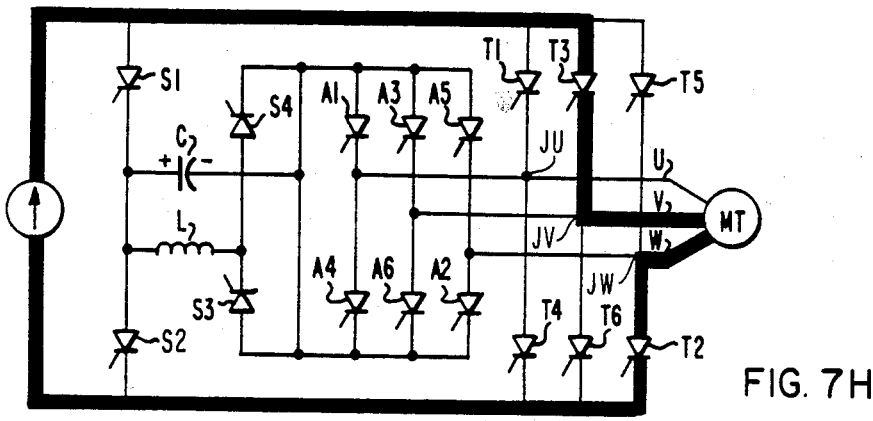

Interval G (FIG. 7H)

At time $t_5$ (FIG. 6B) thyristors $T_2$ and $T_3$ are turned ON and all other thyristors are OFF. This is the final state at the end of the commutation cycle.

The preceding sequence of operation described a commutation between thyristors $T_1$ and $T_3$. Similar sequences of events are required to commutate between $T_2$ and $T_4$, $T_3$ and $T_5$, $T_4$ and $T_6$, and $T_5$ and $T_1$ before the above-described commutation sequence is repeated.

There are other implementations of the invention.

Figure 8:
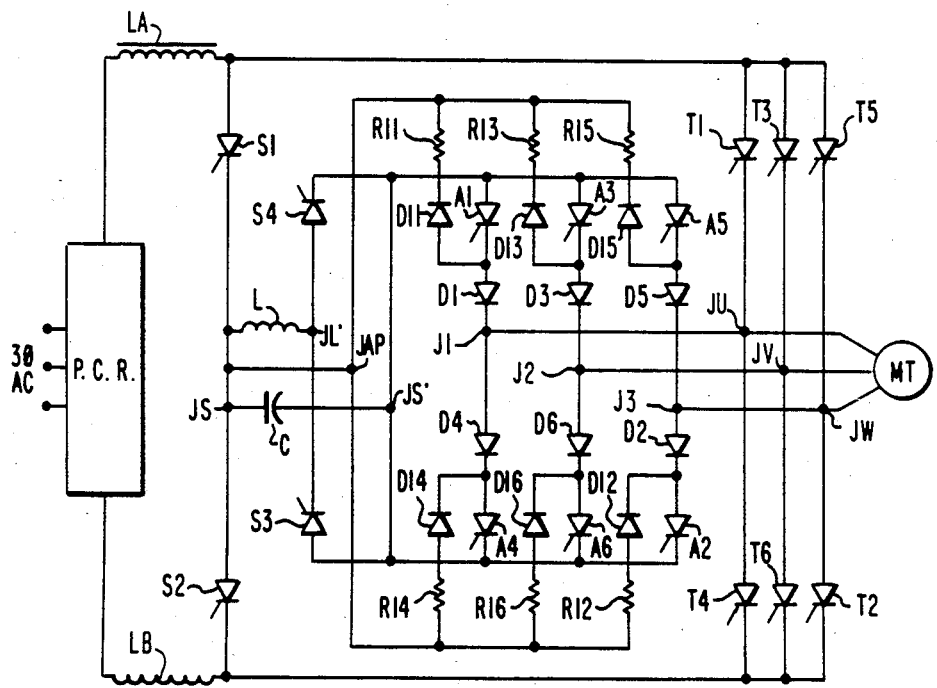
FIGS. 8 and 9 are two variants of the current source inverter of FIG. 5.

For instance, FIG. 8 shows a modification of the circuit of FIG. 5 which eliminates the large dv/db build-up across the auxiliary thyristors, as illustrated upon thyristor A1 by the mode associated with time interval B in FIGS. 6B and 7B. To this effect, diodes $D_1$ to $D_6$ are serially connected with the auxiliary thyristors $A_1-A_6$, respectively, and serial networks are provided including a diode and a resistor, namely ($D_{11}$, $R_{11}$) to ($D_{16}$, $R_{16}$) which are connected in antiparallel fashion via junction point $J_{AP}$ with the auxiliary thyristor bridge and the commutating capacitor C, respectively, to the respective nodal points between ($A_1$, $D_1$), ($A_2$, $D_2$) . . . ($A_6$, $D_6$).

Figure 9:
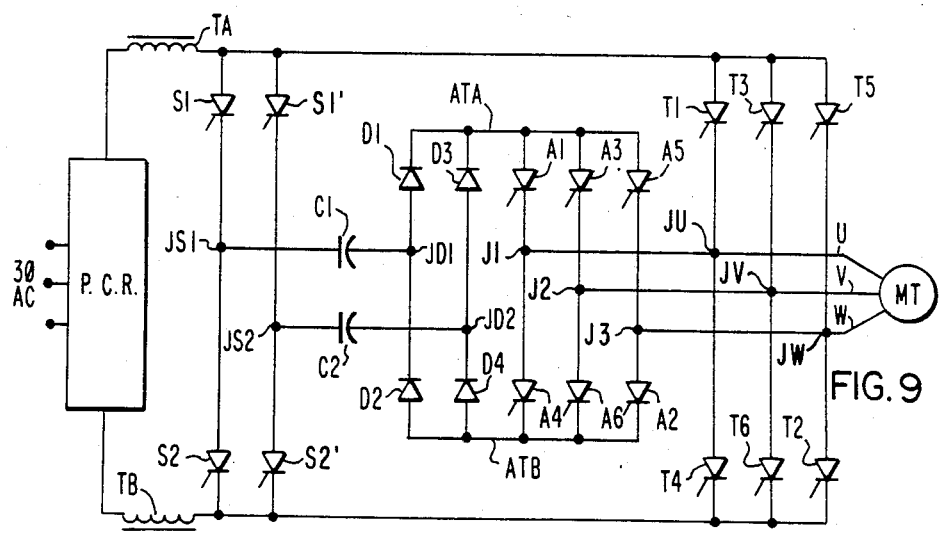

Another variant is shown in FIG. 9. There, two capacitors $C_1$ and $C_2$ are used, instead of one commutating capacitor C and of the inductor L. Capacitor $C_1$ is associated with commutating thyristors S1, S2, and capacitor $C_2$ is associated with commutating thyristors S1', S2', in the same fashion as were C and L in FIG. 5. However, diodes $D_1$, $D_2$, associated with $C_1$, and $D_3$, $D_4$ associated with $C_2$, are mounted in antiparallel fashion with the auxiliary thyristor bridge ($A_1-A_6$). With this configuration, a total capacitance value can be selected by control in three levels: $C_1$, $C_2$ and $C_1+C_2$. Capacitor $C_1$ represents the lower capacitance value; capacitor $C_2$ has a value larger than $C_1$, and the maximum capacitance is effective when both are used, namely ($C_1+C_2$). These values are used, $C_1$ for the lowest load condition, $C_2$ for the middle load condition, and ($C_1+C_2$) for maximum load. Such capacitance value adjustment is effected by controlling the commutation thyristors (S1, S2, S1', S2') individually, or concurrently, in relation to the load current (S1, S2) for the value $C_1$; (S1', S2') for the value $C_2$ and both (S1, S1', S2, S2') for the maximum value ($C_1+C_2$). This results in a wide operative frequency range like with the capacitor voltage inversion approach used in the embodiment of FIG. 5.

It is observed that the effect of the operation of the auxiliary thyristors is to reduce the peak capacitor voltage, and hence the thyristor's voltage, which actually becomes a little more than one-half of what it could be otherwise. Moreover, no voltage clamp circuit is necessary, which would have been bulky and expensive. The reason that the voltage stress is reduced lies in that a larger than "normal" capacitor can be used, thanks to the precommutation process, since the larger the capacitor the more the voltage stress is lowered.

I claim:

1. In an auto-sequential commutated current source inverter (ASCI) system including a current source between main input DC terminals, a bridge of main thyristors connected across a positive and a negative one of said main input terminals and sequentially controlled for conduction between said main DC terminals and a set of output AC terminals; and commutation capacitor means resonantly charged and discharged between said main DC terminals and said AC terminals for commutating said main thyristors, the combination of a bridge of auxiliary thyristors connected between two auxiliary terminals and sequentially controlled for conduction between said auxiliary terminals and said AC terminals;

a first series-combination of said capacitor means and of first switching means, said first switching means being connected across said DC terminals and having a first nodal point therebetween, said capacitor means being connected between said first nodal point and each of said auxiliary terminals;

a second series-combination of inductance means and of second switching means, said second switching means being connected in antiparallel to said auxiliary bridge across said auxiliary terminals, and having a second nodal point therebetween, said inductance means being connected between said first and second nodal points;

with said capacitor means being initially charged to a maximum voltage appropriate to commutate the outgoing main thyristor, said first series-combination being controlled for conduction together with one auxiliary thyristor of matching polarity to discharge said capacitor means to a precommutation level lesser than said maximum voltage and of at least the turn-OFF voltage for the main thyristor next to be turned-OFF.

2. The system of claim 1 with another auxiliary thyristor of the same polarity being controlled to turn ON for causing said one thyristor to be turned OFF under said precommutation level $V_{c1}$ while maintaining a current path through said other main thyristor.

3. The system of claim 2 with said second series-combination being controlled for conduction to reverse the polarity charge of said capacitor means.

4. The system of claim 3 with said second series-combination being controlled to establish on said capacitor means a reverse voltage sufficient to turn OFF said one auxiliary thyristor, said one auxiliary thyristor being turned OFF thereafter.

5. The system of claim 3 with said reverse voltage in said capacitor means being less than sufficient to turn OFF said one auxiliary thyristor, said first series-combination being controlled to no-conduction and said one and other auxiliary thyristors being turned OFF under said capacitor means.

6. The system of claim 3 with another main thyristor in the sequence of said main thyristors being turned ON under said other auxiliary thyristor and said first series-combination, thereby to charge said capacitor means initially.

7. The system of claim 6 with said first series combination being controlled for non-conduction.

8. The system of claim 1 with said first switching means including two main DC terminal switching thyristors in series between said main DC terminals and about a nodal point, with said capacitor means including at least one capacitor connected between said main DC terminals switching thyristors nodal point and said auxiliary terminals.

9. The system of claim 8 with said second switching means including two auxiliary terminal switching thyristors in series about a nodal point between said auxiliary terminals and in antiparallel relation to said auxiliary thyristor bridge, with said inductance means including at least one inductor connected between the nodal points of said main DC terminal switching thyristors and said auxiliary terminal switching thyristors.

10. The system of claim 9 with at least one diode being associated in series with each main thyristor and the corresponding AC terminal;

an antiparallel series network comprising a diode and a resistor being connected with each main thyristor from the common point with the associated diode and the nodal point of said DC terminal switching thyristors.

11. In an auto-sequential commutated current source inverter (ASCI) system operative with a variable load and including a current source between main input DC terminals, a bridge of main thyristors connected across a positive and a negative one of said main input terminals and sequentially controlled for conduction between said main DC terminals and a set of output AC terminals; and commutation capacitor means resonantly charged and discharged between said main DC terminals and said AC terminals for commutating said main thyristors, the combination of:

a bridge of auxiliary thyristors connected between two auxiliary terminals and sequentially controlled for conduction between said auxiliary terminals and said AC terminals;

said commutation capacitor means comprising a first capacitor of a predetermined first capacitance value selected to correspond to a minimum load condition, a second capacitor of a predetermined second capacitance value selected to correspond to an intermediate load condition, with the sum of said first and second predetermined capacitance values corresponding to a maximum load condition;

a first series-combination of said first capacitor and of first switching means with a nodal point therebetween;

a second series-combination of said second capacitor and of second switching means with a nodal point therebetween;

first and second diode means each in series between said auxiliary terminals and about a corresponding one of said nodal points; with the associated switching means in each of said first and second series-combinations being connected in series between said main DC terminals about the corresponding nodal point, said diode means being in antiparallel to said auxiliary bridge;

said first and second capacitors in each of said first and second series-combinations being connected between nodal points of the associated switching means and diode means;

with the system being operated with at least one of said first and second series-combinations in order to match the effective capacitance with the instantaneous load condition.

* * * * *